US008896758B2

(12) United States Patent
Funatsu

(10) Patent No.: US 8,896,758 B2
(45) Date of Patent: Nov. 25, 2014

(54) VIDEO SIGNAL PROCESSING CIRCUIT, VIDEO SIGNAL PROCESSING METHOD, DISPLAY DEVICE, AND ELECTRONIC APPARATUS

(75) Inventor: Yohei Funatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 13/460,177

(22) Filed: Apr. 30, 2012

(65) Prior Publication Data

US 2012/0320274 A1 Dec. 20, 2012

(30) Foreign Application Priority Data

Jun. 14, 2011 (JP) ................................ 2011-132006

(51) Int. Cl.
*H04N 5/63* (2006.01)
*H04N 5/57* (2006.01)
*G09G 5/10* (2006.01)
*G09G 3/20* (2006.01)

(52) U.S. Cl.
CPC .......... *G09G 3/20* (2013.01); *G09G 2320/0626* (2013.01); *G09G 2330/021* (2013.01); *G09G 2360/16* (2013.01)
USPC ............................ 348/687; 348/730; 345/690

(58) Field of Classification Search
USPC .................................. 348/687, 730; 345/690
See application file for complete search history.

(56) References Cited

U.S. PATENT DOCUMENTS 6,496,165 B1 * 12/2002 Ide et al. ......................... 345/60
6,710,818 B1 * 3/2004 Kasahara et al. ............. 348/607
6,771,243 B2 * 8/2004 Hirohata ......................... 345/89
6,836,288 B1 * 12/2004 Lewis ........................ 348/229.1
7,154,468 B2 * 12/2006 Linzmeier et al. ............ 345/102
7,259,769 B2 * 8/2007 Diefenbaugh et al. ........ 345/604
7,342,578 B2 * 3/2008 Joo .............................. 345/211
7,348,957 B2 * 3/2008 Cui et al. ...................... 345/102
7,796,143 B2 * 9/2010 Huang .......................... 345/690
7,843,400 B2 * 11/2010 Nakai et al. .................... 345/1.3
8,022,907 B2 * 9/2011 Park et al. ........................ 345/77
2002/0158971 A1 * 10/2002 Daiku et al. ............... 348/226.1
2003/0016189 A1 * 1/2003 Abe et al. ........................ 345/55
2003/0210256 A1 * 11/2003 Mori et al. .................... 345/690
2004/0174378 A1 * 9/2004 Deering ........................ 345/611
2005/0185100 A1 * 8/2005 Akiyama ...................... 348/678
2005/0231498 A1 * 10/2005 Abe et al. ...................... 345/204
2006/0077200 A1 * 4/2006 Tamayama .................... 345/211
2007/0139406 A1 * 6/2007 Ozawa et al. ................. 345/211
2007/0140356 A1 * 6/2007 Wada ....................... 375/240.26
2007/0164944 A1 * 7/2007 Meados et al. .................. 345/84
2007/0182831 A1 * 8/2007 Katoh et al. ............... 348/226.1
2008/0002038 A1 * 1/2008 Suwa ......................... 348/229.1
2008/0062162 A1 * 3/2008 Mamba et al. ................ 345/213
2008/0075382 A1 * 3/2008 Sugeno et al. ................ 382/270
2008/0238856 A1 * 10/2008 Bhowmik et al. ............. 345/102

(Continued)

FOREIGN PATENT DOCUMENTS

JP 2003-255901 9/2003

*Primary Examiner* — Brian Yenke

(74) *Attorney, Agent, or Firm* — Rader, Fishman & Grauer PLLC

(57) ABSTRACT

A video signal processing circuit includes: a control unit that calculates a luminance integrated value on the basis of an input video signal and performs luminance control for the video signal on the basis of the calculated luminance integrated value, wherein the control unit calculates the luminance integrated value at a period shorter than time equivalent to one frame.

21 Claims, 11 Drawing Sheets

(56) References Cited

U.S. PATENT DOCUMENTS

| | | | | |
|---|---|---|---|---|
| 2008/0297662 | A1* | 12/2008 | Gibbs | 348/725 |
| 2009/0046180 | A1* | 2/2009 | Shibano et al. | 348/243 |
| 2009/0289968 | A1* | 11/2009 | Yoshida | 345/691 |
| 2010/0054542 | A1* | 3/2010 | Archibald et al. | 382/107 |
| 2010/0171733 | A1* | 7/2010 | Kobayashi | 345/211 |
| 2010/0201883 | A1* | 8/2010 | Delva et al. | 348/607 |
| 2011/0134157 | A1* | 6/2011 | Chaji | 345/690 |
| 2011/0193893 | A1* | 8/2011 | Miyazawa | 345/690 |
| 2012/0019167 | A1* | 1/2012 | Chen et al. | 315/307 |
| 2012/0026359 | A1* | 2/2012 | Fukushima et al. | 348/226.1 |
| 2012/0307161 | A1* | 12/2012 | Ishihara et al. | 348/731 |
| 2012/0327141 | A1* | 12/2012 | Yoshida | 345/690 |
| 2013/0002905 | A1* | 1/2013 | Takakura et al. | 348/231.99 |
| 2013/0057772 | A1* | 3/2013 | Ishihara | 348/725 |

* cited by examiner

VIDEO SIGNAL PROCESSING CIRCUIT, VIDEO SIGNAL PROCESSING METHOD, DISPLAY DEVICE, AND ELECTRONIC APPARATUS

FIELD

The present disclosure relates to a video signal processing circuit, a video signal processing method, a display device, and an electronic apparatus and, more particularly, to a video signal processing circuit and a video signal processing method for performing luminance control for a video signal, a display device including the video signal processing circuit, and an electronic apparatus including the display device.

BACKGROUND

When a high-luminance video signal is input to a display device, it is possible to reduce current consumption (power consumption) by controlling a video signal input to a display panel and suppressing an electric current flowing to electro-optical components of pixels.

In the past, a video signal processing circuit that performs such control calculates a luminance integrated value for each one screen (one frame) on the basis of an input video signal, controls the amplitude of the video signal on the basis of the calculated luminance integrated value, and supplies the video signal subjected to the amplitude control to the display device (see, for example, JP-A-2003-255901).

SUMMARY

The video signal processing circuit according to the related art calculates a luminance integrated value for each one frame from an input video signal and performs luminance control for the video signal on the basis of a result of the calculation. Consequently, since a calculation result of the preceding frame is reflected on the control of the present frame, a delay of time equivalent to one frame typically occurs when the calculation result is reflected on the luminance control. Therefore, in a period of one frame for calculating the luminance integrated value, it is difficult to perform the luminance control for the video signal, i.e., control for reducing current consumption.

Therefore, it is desirable to provide a video signal processing circuit and a video signal processing method that enable, concerning luminance control for a video signal, control at a period shorter than time equivalent to one frame, a display device including the video signal processing circuit, and an electronic apparatus including the display device.

An embodiment of the present disclosure is directed to a video signal processing circuit that calculates a luminance integrated value on the basis of an input video signal and performs luminance control for the video signal on the basis of the calculated luminance integrated value. The video signal processing circuit calculates the luminance integrated value at a period shorter than time equivalent to one frame.

In a display device, the video signal processing circuit can be used as a circuit that processes a video signal input to the display device. In various electronic apparatuses, the display device including the video signal processing circuit can be used as a display unit of the electronic apparatuses.

Since the luminance integrated value is calculated at the period shorter than the time equivalent to one frame, luminance control for the video signal based on a result of the calculation can be executed at the period shorter than the time equivalent to one frame. Therefore, it is possible to perform control for a reduction of the current consumption of the display device without waiting for the time equivalent to one frame (a period of one frame).

According to the embodiment of the present disclosure, it is possible to perform luminance control for a video signal without waiting for the time equivalent to one frame. Therefore, it is possible to realize control of current consumption (power consumption) without a delay of the time equivalent to one frame.

BRIEF DESCRIPTION OF THE DRAWINGS

FIGS. 8A and 8B are perspective views of the external appearance of a digital camera to which the present disclosure is applied, wherein FIG. 8A is a perspective view of the digital camera viewed from the front side and FIG. 8B is a perspective view of the digital camera viewed from the rear side;

FIGS. 11A to 11G are external views of a cellular phone to which the present disclosure is applied, wherein FIG. 11A is a front view of the cellular phone in an open state, FIG. 11B is a side view of the cellular phone in the open state, FIG. 11C is a front view of the cellular phone in a closed state, FIG. 11D is a left side view of the cellular phone, FIG. 11E is a right side view of the cellular phone, FIG. 11F is a top view of the cellular phone, and FIG. 11G is a bottom view of the cellular phone.

DETAILED DESCRIPTION

Figure 1:
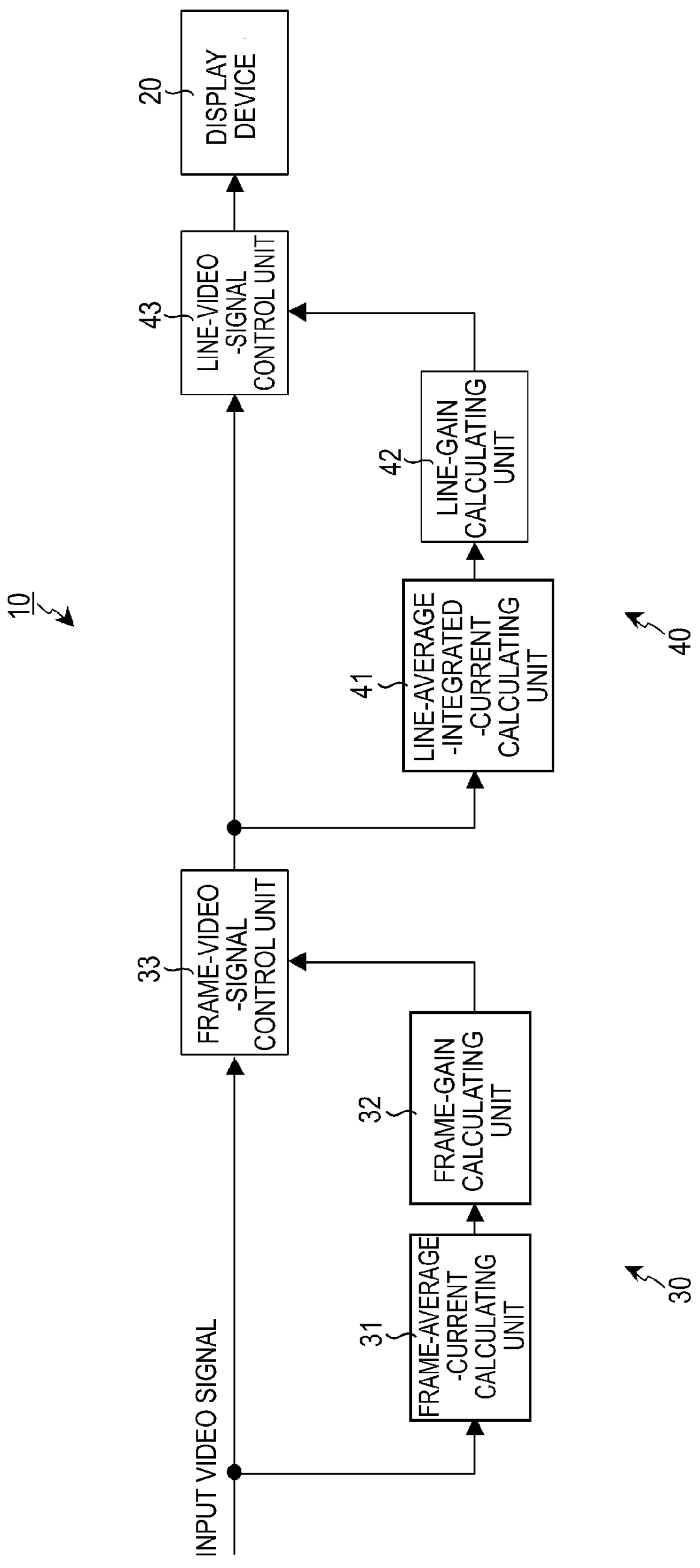
FIG. 1 is a block diagram of a circuit configuration of a video signal processing circuit according to an embodiment of the present disclosure.

Exemplary embodiments of the present disclosure are explained below in detail with reference to the accompanying drawings. The explanation is made in the order described below.

1. Explanation of an Embodiment
    1-1. Circuit Configuration
    1-2. Circuit Operation
2. Modification
3. Electronic Apparatus
4. Configuration of the Present Disclosure <1. Explanation of an Embodiment>

A video signal processing circuit according to an embodiment of the present disclosure is provided between a signal source and a display device (or a display panel). The video signal processing circuit processes a video signal input from the signal source (an input video signal) and supplies the video signal to the display device. The video signal processing circuit calculates a luminance integrated value on the basis of the input video signal and performs luminance control by controlling the video signal on the basis of the calculated luminance integrated value. In general, the video signal processing circuit is called ABL (Automatic Brightness Limiter) circuit.

The video signal processing circuit according to this embodiment includes a control unit that calculates a luminance integrated value at a period shorter than time equivalent to one frame (one screen) and controls a video signal on the basis of the calculated luminance integrated value. The control unit controls the video signal to be small when the luminance integrated value is larger than a control target value.

The period shorter than the time equivalent to one frame may be a unit of time equivalent to one line (one pixel row). In this case, the period shorter than the time equivalent to one frame may be either the time equivalent to one line or time equivalent to plural lines. The period shorter than the time equivalent to one frame is not limited to the unit of the time equivalent to one line and may be a unit of time equivalent to one dot (one pixel) shorter than the time equivalent to one line.

A video signal processing circuit according to this embodiment desirably includes two control systems, i.e., a first control system and a second control system. The first control system is a control system that calculates a luminance integrated value at a period of time equivalent to one frame and controls a video signal on the basis of the luminance integrated value. The second control system is a control system that is equivalent to the control unit and calculates a luminance integrated value at a period shorter than the time equivalent to one frame and controls the video signal on the basis of the luminance integrated value.

In the second control system, the period shorter than the time equivalent to one frame may be a unit of time equivalent to one line. In this case, the period shorter than the time equivalent to one frame may be either the time equivalent to one line or time equivalent to plural lines. The period shorter than the time equivalent to one frame is not limited to a unit of the time equivalent to one line and may be a unit of time equivalent to one dot (one pixel) shorter than the time equivalent to one line.

Concerning an arrangement relation between the first control system and the second control system, it is desirable to provide the second control system at the post-stage of the first control system. In other words, in the video signal processing circuit according to this embodiment, in addition to the well-known first control system, the second control system that calculates a luminance integrated value at the period shorter than the time equivalent to one frame and controls a video signal on the basis of the luminance integrated value is arranged at the post-stage of the first control system. In this case, concerning control target values of the first control system and the second control system, the control target value of the second control system is set to a value higher than the control target value of the first control system.

[1-1. Circuit Configuration]

FIG. 1 is a block diagram of a circuit configuration of the video signal processing circuit according to this embodiment.

In FIG. 1, a video signal processing circuit 10 according to this embodiment is provided between a signal source (not shown) and a display device 20. The video signal processing circuit 10 processes an input video signal given from the signal source and supplies the video signal to the display device 20. The video signal processing circuit 10 generally called ABL circuit desirably includes a combination of two control systems, i.e., a first control system 30 and a second control system 40. The second control system 40 is provided at the post-stage of the first control system 30.

The first control system 30 includes a frame-average-current calculating unit 31, a frame-gain calculating unit 32, and a frame-video-signal control unit 33. The first control system 30 calculates a luminance integrated value at a period of time equivalent to one frame (one screen) and controls a video signal on the basis of the calculated luminance integrated value. The first control system 30 is equivalent to the well-known ABL circuit that performs video signal control (luminance control) at the period of the time equivalent to one frame.

In the first control system 30, the frame-average-current calculating unit 31 calculates, for each frame, an average current of frames. This frame average current is equivalent to a luminance integrated value of one frame. In other words, the frame-average-current calculating unit 31 calculates a frame average current equivalent to a luminance integrated value at the period of the time equivalent to one frame.

The frame-gain calculating unit 32 calculates, on the basis of the frame average current calculated by the frame-average-current calculating unit 31, a gain with respect to a video signal of the frame (hereinafter referred to as "frame gain") referring to a control target value (a frame control target value). The frame-video-signal control unit 33 controls a video signal of the next frame on the basis of the frame gain calculated by the frame-gain calculating unit 32.

The second control system 40 includes a line-average-integrated-current calculating unit 41, a line-gain calculating unit 42, and a line-video-signal control unit 43. The second control system 40 calculates a luminance integrated value, for example, at a period of time equivalent to one line (one pixel row) and controls the amplitude of a video signal on the basis of the calculated luminance integrated value. Specifically, the second control system 40 controls the amplitude of the video signal to be small when the luminance integrated value is larger than a control target value explained below (exceeds the control target value). The second control system 40 is a characteristic part according to the present disclosure.

The respective configurations of the line-average-integrated-current calculating unit 41, the line-gain calculating unit 42, and the line-amplitude control unit 43 are specifically explained below.

(Line-Average-Integrated-Current Calculating Unit)

Figure 2:
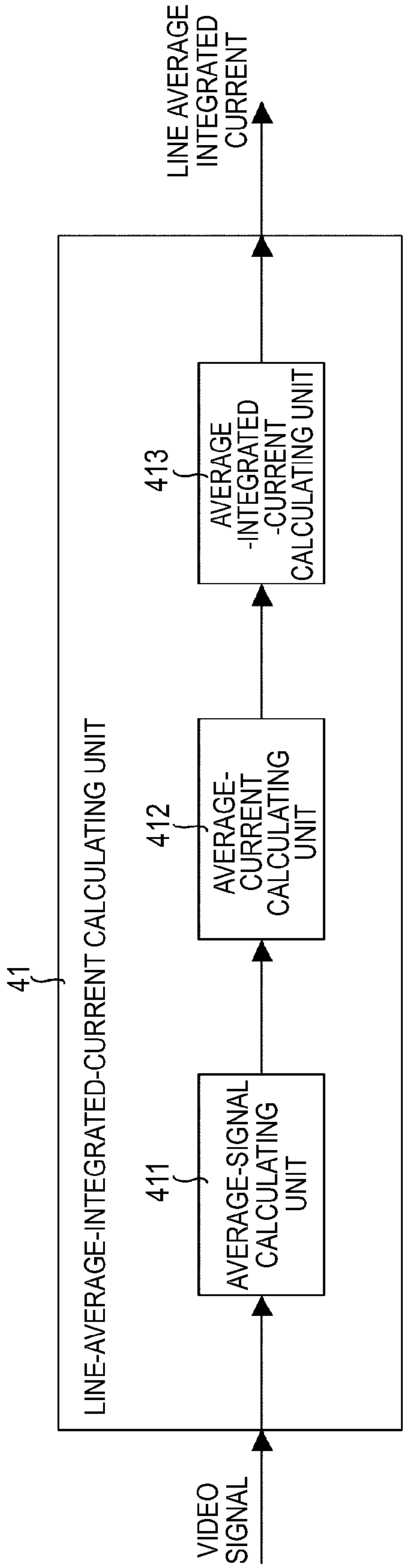
FIG. 2 is a block diagram of a specific example of the configuration of a line-average-integrated-current calculating unit.

FIG. 2 is a block diagram of a specific example of the configuration of the line-average-integrated-current calculating unit 41. As shown in FIG. 2, the line-average-integrated-current calculating unit 41 includes an average-signal calculating unit 411, an average-current calculating unit 412, and an average-integrated-current calculating unit 413. The line-average-integrated-current calculating unit 41 executes a circuit operation at a line period (a horizontal scanning period).

In the line-average-integrated-current calculating unit 41, the average-signal calculating unit 411 calculates an average signal level for each line on the basis of a video signal controlled by the frame-video-signal control unit 33. The average-current calculating unit 412 calculates, for each line, on the basis of the average signal level calculated by the average-signal calculating unit 411, an average current corresponding to the average signal level.

The average-integrated-current calculating unit 413 integrates, up to the present line, the average current for each line calculated by the average-current calculating unit 412 and supplies the integrated average current to the line-gain calculating unit 42 at the next stage as a line average integrated current. The line average integrated current is equivalent to a luminance integrated value up to each line. In other words, the average-integrated-current calculating unit 413 calculates a line average integrated current equivalent to a luminance integrated value at the period shorter than the time equivalent to one frame.

(Line-Gain Calculating Unit)

Figure 3:
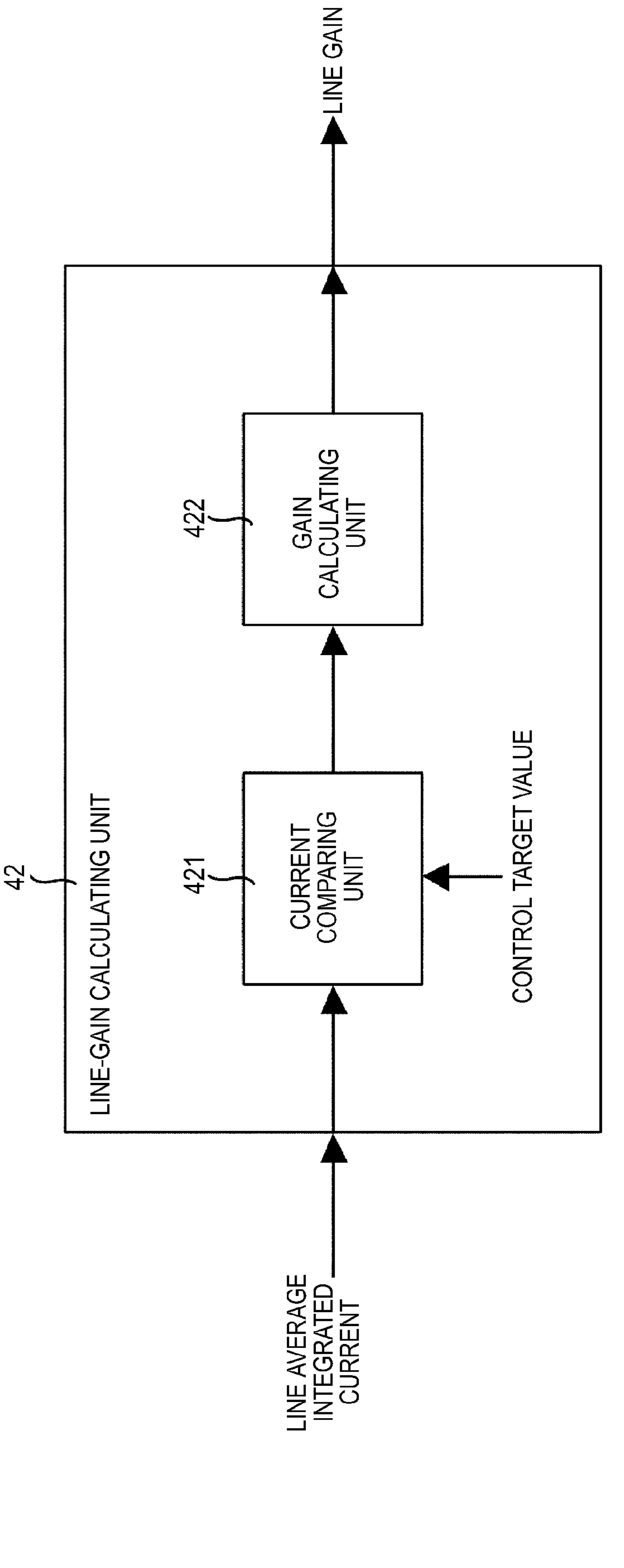
FIG. 3 is a block diagram of a specific example of the configuration of a line-gain calculating unit.

FIG. 3 is a block diagram of a specific example of the configuration of the line-gain calculating unit 42. As shown in FIG. 3, the line-gain calculating unit 42 includes a current comparing unit 421 and a gain calculating unit 422 and executes a circuit operation at a line period.

In the line-gain calculating unit 42, the current comparing unit 421 compares the line average integrated current calculated by the line-average-integrated-current calculating unit 41 at the pre-stage with a control target value (a line control target value) set in advance. The line control target value of the second control system 40 is set to a value higher than the frame control target value of the first control system 30 (a reason for this is explained later). The current comparing unit 421 gives, to the gain calculating unit 422 at the next stage, a comparison result concerning whether the line average integrated current is equal to or smaller than the control target value or exceeds the control target value.

On the basis of the comparison result of the current comparing unit 421, for example, the gain calculating unit 422 supplies a gain "1" to the line-video-signal control unit 43 at the next stage as a line gain when the line average integrated current is equal to or smaller than the control target value and supplies a gain "0" to the line-video-signal control unit 43 at the next stage as the line gain when the line average integrated current exceeds the control target value.

(Line-Video-Signal Control Unit)

Figure 4:
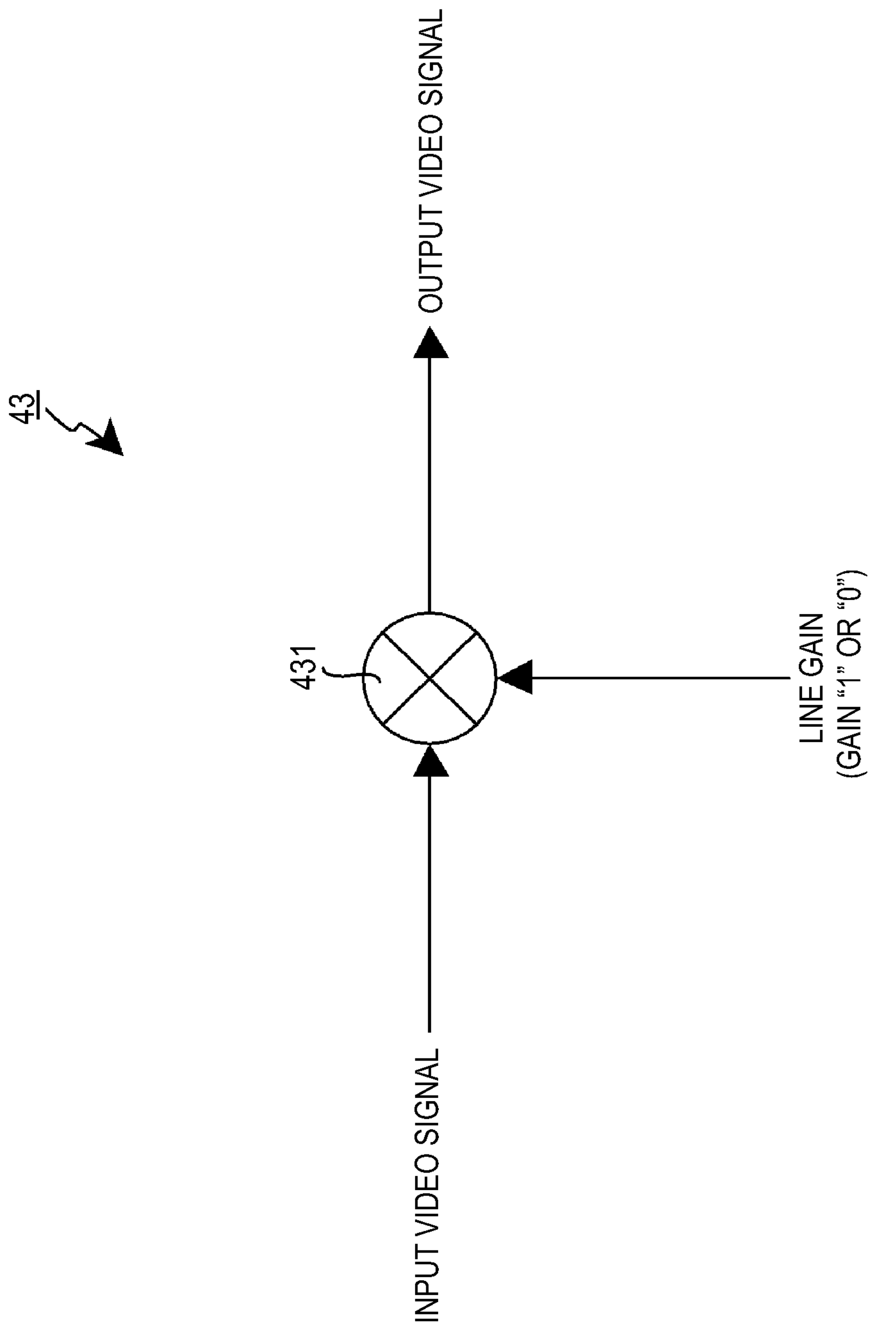
FIG. 4 is a block diagram of a specific example of the configuration of a line-amplitude control unit.

FIG. 4 is a block diagram of a specific example of the configuration of the line-video-signal control unit 43. As shown in FIG. 4, the line-video-signal control unit 43 includes a multiplier 431. The line-video-signal control unit 43 executes a circuit operation at a line period. The multiplier 431 receives the input of the video signal controlled by the frame-video-signal control unit 33 and multiplies the input video signal with the line gain given from the line gain calculating unit 42 to control the video signal.

The control of luminance is performed according to the control of the video signal in the line-video-signal control unit 43, i.e., the multiplier 431. The video signal output from the multiplier 431 (an output video signal) is supplied to the display device 20.

[1-2. Circuit Operation]

A circuit operation of the video signal processing circuit 10 according to this embodiment having the configuration explained above is explained below.

(First Control System)

A video signal supplied from the signal source (not shown) is first input to the first control system 30. A flow of the video signal input to the first control system 30 is divided into two video signals. One is directly sent to the frame-video-signal control unit 33 and the other is sent to the frame-average-current calculating unit 31.

The video signal sent to the frame-video-signal control unit 33 is input to the second control system 40 at the next stage after being subjected to control based on the frame gain, which is calculated by the frame-gain calculating unit 32, by the frame-video-signal control unit 33. On the other hand, the video signal sent to the frame-average-current calculating unit 31 is used for calculating a frame average current until the video signal for one frame ends.

The frame-average-current calculating unit 31 determines, at a stage when the video signal for one frame ends, an average current for the one frame, i.e., a frame average current equivalent to a luminance integrated value of the video signal for one frame. The frame-average-current calculating unit 31 sends the determined frame average current to the frame-gain calculating unit 32. The frame-gain calculating unit 32 determines a frame gain on the basis of the frame average current sent from the frame-average-current calculating unit 31 using the frame control target value as a control reference. The frame-gain calculating unit 32 sends the determined frame gain to the frame-video-signal control unit 33.

As it is evident from the above explanation, in the first control system 30, a frame average current equivalent to a luminance integrated value is calculated concerning certain one frame, a frame gain is determined on the basis of the frame average current, and the frame gain is reflected on control of a video signal of the next frame, i.e., luminance control.

Therefore, even if a frame average current exceeds the frame control target value in certain one frame, the luminance control is not applied to a video signal of the frame and is applied to a video signal of the next frame. In other words, a delay of time equivalent to one frame typically occurs when a calculation result of the frame average current is reflected on the luminance control. Therefore, it is difficult to perform the luminance control for the video signal, i.e., control for reducing current consumption (power consumption) in a period of one frame.

(Second Control System)

The video signal controlled by the first control system 30 is input to the second control system 40. A flow of the video signal input to the second control system 40 is divided into two video signals. One is directly sent to the line-video-signal control unit 43 and the other is sent to the line-average-integrated current calculating unit 41.

The video signal sent to the line-video-signal control unit 43 is output to a data driver (not shown) of the display device 20 at the post-stage after being subjected to control based on the line gain, which is calculated by the line-gain calculating unit 42, by the line-video-signal control unit 43. In this embodiment, the video signal controlled by the line-video-signal control unit 43 is directly supplied to the display device 20. However, the video signal may be supplied to the display device 20 through a signal processing circuit that performs desired signal processing.

On the other hand, the video signal sent to the line-average-integrated-current calculating unit 41 is used for calculating a line average integrated current until a video signal for one line ends. The line-average-integrated-current calculating unit 41 calculates, at a stage when the video signal for one line ends, an integrated current to the present line, i.e., a line average integrated current equivalent to a luminance integrated value to the present line. The line-average-integrated-current calculating unit 41 sends the line average integrated current to the line-gain calculating unit 42.

The line-gain calculating unit 42 determines a line gain on the basis of the line average integrated current sent from the line-average-integrated-current calculating unit 41 using the line control target value as a control reference. Specifically, for example, the line-gain calculating unit 42 sets the line gain to "1" when the line average integrated current is equal to or smaller than the control target value and sets the line gain to "0" when the line average integrated current exceeds the control target value. The line-gain calculating unit 42 sends the line gain determined in this way to the line-video-signal control unit 43.

As explained above, in the first control unit 30, it is difficult to perform the luminance control until one frame ends. On the other hand, in the second control system 40, a line average integrated current equivalent to a luminance integrated value is calculated in a line unit, a line gain is determined on the basis of the line average integrated current, and the line gain is reflected on control of a video signal, i.e., luminance control in the next and subsequent lines. Consequently, it is possible to perform the luminance control without waiting for a period of one frame, i.e., in a unit shorter than the time equivalent to one frame.

It is possible to suppress an electric current flowing to electro-optical components of pixels of the display device 20 by performing the control of a video signal, i.e., the luminance control. Therefore, it is possible to reduce the current consumption (power consumption) of the display device 20. In other words, controlling the luminance of the video signal is controlling the current consumption of the display device 20.

(Specific Example)

A specific example is considered in which an average signal level of an input video signal shifts from a relatively low state to a relatively high state and control of current consumption, i.e., control of a video signal shifts from a non-operation state to an operation state.

Figure 5:
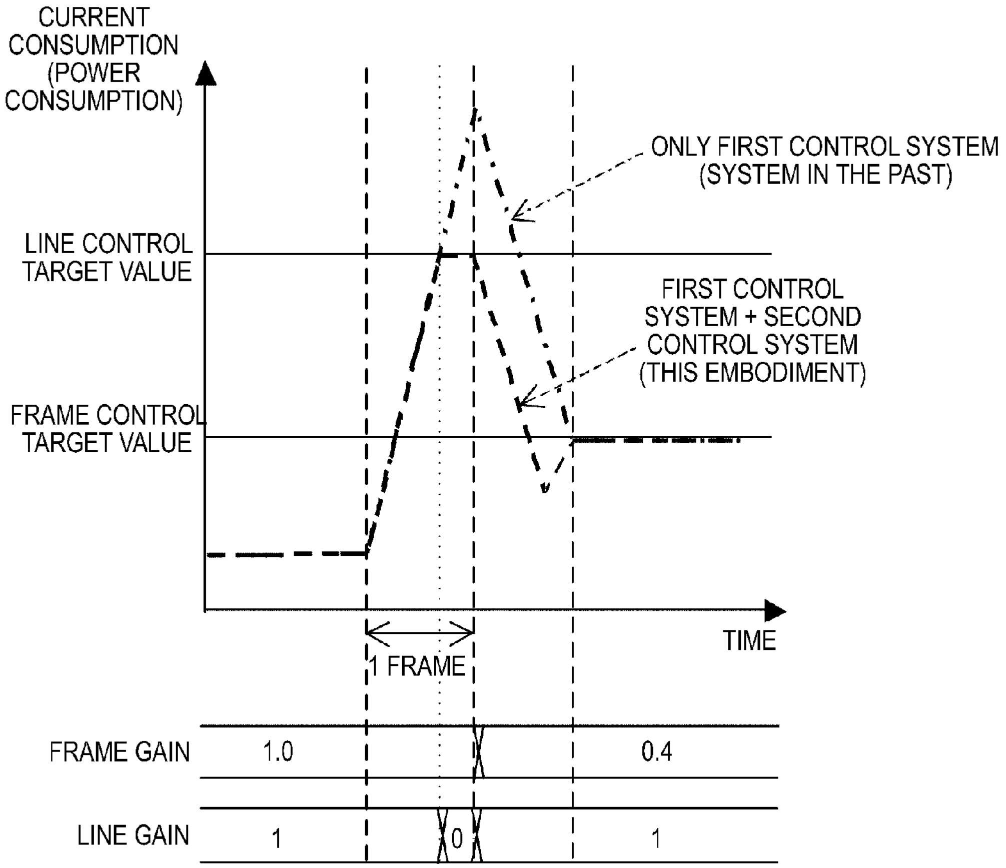
FIG. 5 is a diagram served for explanation of the operation of a video signal processing circuit according to a specific example.

At a point when a frame starts at an instance when the control of a video signal shifts from the non-operation state to the operation state, a value in a low state of an average signal level is set as a frame gain of the first control system 30. Therefore, the frame-video-signal control unit 33 performs control with the frame gain of the value. Specifically, as shown in FIG. 5, when a frame gain in a frame before the shift of the control from the non-operation state to the operation state is, for example, 1.0, a frame gain of the present frame also remains at 1.0.

In other words, the frame-video-signal control unit 33 outputs a video signal same as a video signal before the shift of the control from the non-operation state to the operation state. Therefore, in control only by the first control system 30 equivalent to the related art, regardless of the fact that the average signal level of the input video signal shifts from the relative low state to the relative high state, an uncontrolled video signal is input to the display device 20. Consequently, an over current is generated in a period of maximum two frames before and after one frame at the shift of the control from the non-operation state to the operation state. It is difficult to perform the control of current consumption until the period of the two frame ends.

On the other hand, in this embodiment, the second control system 40 is arranged at the post-stage of the first control system 30. Control of a video signal for each one line is performed in the second control system 40. Therefore, when a line average integrated current exceeds the line control target value in the frame at the instance when the control shifts from the non-operation state to the operation state, as shown in FIG. 5, a line gain is set to, for example, 0.0 from the next line to the last line. When the line gain is set to 0.0, since a signal level of the video signal decreases to 0, black (black belt) display is performed in a period from the next line to the last line.

Consequently, it is possible to perform luminance control for the video signal in a line unit without waiting for the period of one frame to end. Therefore, it is possible to suppress the over current in the maximum two frames. The black display is performed when the line average integrated current exceeds the line control target value. However, this is only an example. For example, gray display may be performed.

At a point when the frame at the shift of the average signal level of the input video signal from the relatively low state to the relatively high state ends and the next frame starts, as shown in FIG. 5, a value in a high state of the average signal level, i.e., a value calculated in the preceding frame (e.g., 0.4) is set as a frame gain. Therefore, the frame-video-signal control unit 33 performs control with the frame gain of the value.

In other words, the frame-video-signal control unit 33 outputs a small video signal corresponding to the frame gain of the value calculated in the preceding frame. Consequently, in the second control system 40 at the post-stage, the amplitude of an input video signal is small and a control target value is set higher than the control target value of the first control system 30. Therefore, thereafter, control in a line unit is not performed, i.e., control in a line unit changes to the non-operation state.

In FIG. 5, instantaneous panel current consumption at certain time is shown. When the display panel is line-sequentially driven and a display image is a raster image (an image uniform over the entire surface), the behavior of the operation is as shown in FIG. 5. In a natural image such as a broadcast signal, a curve shown in FIG. 5 indicates non-linear complicated behavior.

(Action and Effects)

As explained above, with the video signal processing circuit 10 according to this embodiment, the control by the second control system 40 operates in the frame at the instance when the average signal level of the input video signal shifts from the relatively low state to the relatively high state. In frames other than the frame, the control by the second control system 40 does not operate and the control by the first control system 30 operates.

Consequently, it is possible to perform the luminance control for a video signal without waiting for the time equivalent to one frame. Therefore, it is possible to realize the control of current consumption (power consumption) without a delay equivalent to one frame while performing current control same as the current control in the system in the past. It is possible to prevent the over current in the maximum two frames. Depending on an electronic apparatus mounted with the display device 20, since an upper limit of power consumption in one frame is set. Therefore, since the power consumption in one frame can be controlled, the display device 20 is suitably applied to an electronic apparatus in which an upper limit of the power consumption in one frame is set, in particular, a portable electronic apparatus.

Incidentally, it is also possible to perform the luminance control for a video signal without waiting for the time equivalent to one frame by adopting a method of performing luminance control using a frame memory. However, cost increases when the frame memory is used. On the other hand, when the configuration of the video signal processing circuit 10 according to this embodiment, i.e., the configuration including both the first control system 30 and the second control system 40 is adopted, it is unnecessary to use the expensive frame memory. Therefore, there is an advantage that it is possible to attain the expected object at low cost.

Concerning the arrangement of the first control system 30 that performs control in a frame unit and the second control system 40 that performs control in a line unit, an arrangement relation in which the first control system 30 is arranged at the pre-stage and the second control system 40 is arranged at the post-stage is desirable. This is because, if the second control system 40 is arranged at the pre-stage, the control by the second control system 40 is frequently performed and a black belt is displayed on a screen every time the control is performed. As a result, image quality is deteriorated.

On the other hand, if the second control system 40 is arranged at the post-stage, the second control system 40 applies control to a video signal controlled by the first control system 30 at the pre-stage. Therefore, a deficiency that occurs when the second control system 40 is arranged at the pre-stage does not occur. In other words, the control by the second control system 40 is applied to a frame not subjected to the amplitude control by the first control system 30. Therefore, even if a black belt occurs, the black belt occurs only in the frame.

Incidentally, to apply the control by the second control system 40 to only a frame not controlled by the first control system 30, it is necessary to set the control target value of the second control system 40 to a value higher than the control target value of the first control system 30.

<2. Modification>

In the circuit example explained above, the configuration for performing the control (the luminance control) by the second control system 40 at the period of the time equivalent to one line (i.e., for each one line) is adopted. However, it is also possible to adopt a configuration for performing the control at a period of time equivalent to plural lines (i.e., for each plural lines).

The control by the second control system 40 may be performed in a unit of time equivalent to one dot (one pixel), i.e., for each one dot or each plural dots rather than being performed in the unit of the time equivalent to one line, i.e., for each one line or each plural lines. However, when the control is performed in the unit of the time equivalent to one line, processing such as calculation of a line average integrated current and calculation of a line gain can be performed in a horizontal blanking period. Therefore, it is advantageous to perform the control in the unit of the time equivalent to one line compared with performing the control in the unit of the time equivalent to one dot because it is unnecessary to specially secure time for calculation processing.

(Amplitude Control in a Dot Unit)

Figure 6:
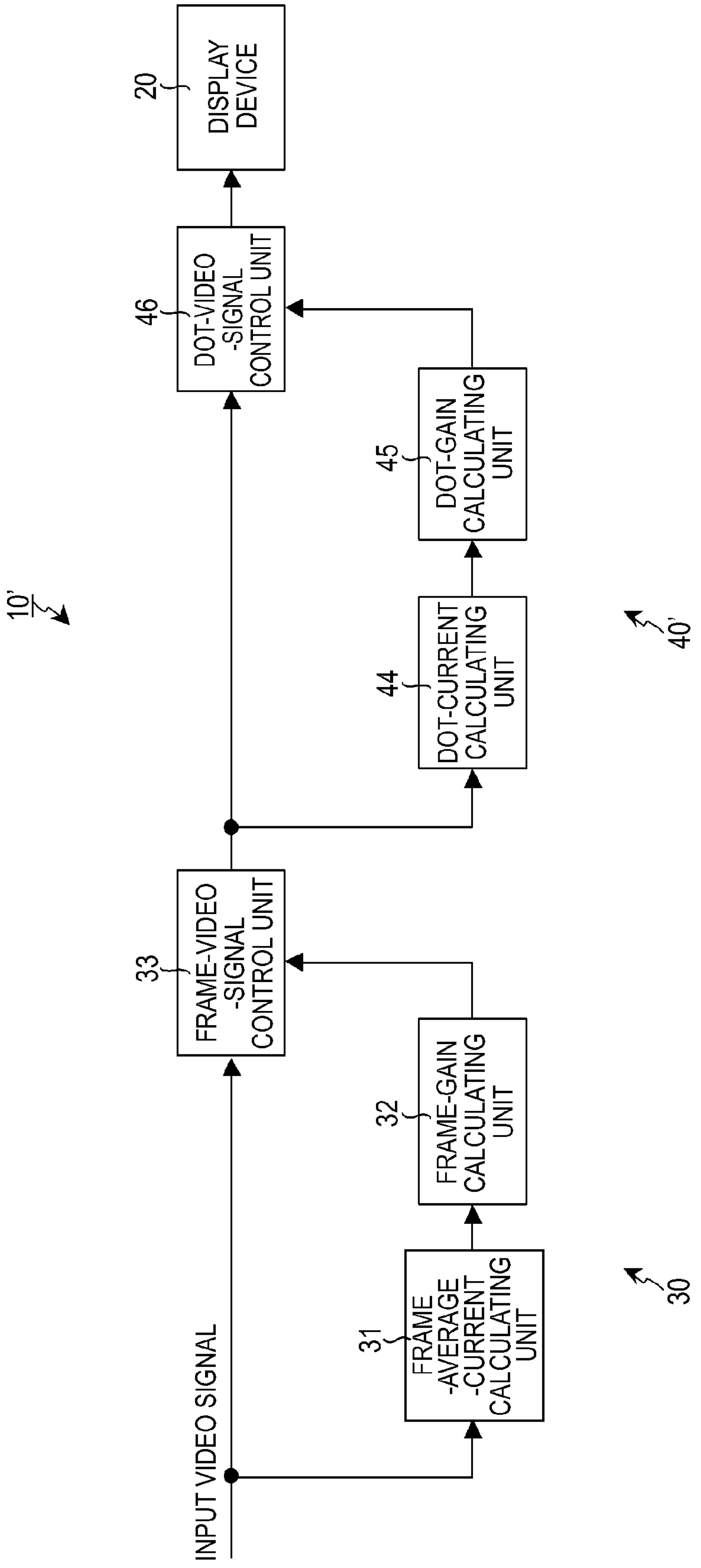
FIG. 6 is a block diagram of a circuit configuration of a video signal processing circuit according to a modification.

FIG. 6 is a block diagram of a circuit configuration of a video signal processing circuit according to a modification in which control is performed for each one dot. In the figure, components equivalent to the components shown in FIG. 1 are denoted by the same reference numerals and signs.

In a video signal processing circuit 10' according to this modification, compared with the video signal processing circuit 10 according to the embodiment explained above, the configuration of a second control system 40' is different from the configuration of the second control system 40. Specifically, the second control system 40' is configured to perform control, for example, at a period of time equivalent to one dot using a dot-current calculating unit 44, a dot-gain calculating unit 45, and a dot-video-signal control unit 46 instead of the line-average-integrated-current calculating unit 41, the line-gain calculating unit 42, and the line-video-signal control unit 43.

In the second control system 40', the dot-current calculating unit 44 detects a dot current equivalent to the luminance of one pixel when the control is performed at the period of the time equivalent to one dot and detects a dot average current equivalent to a luminance integrated value of plural pixels when the control is performed at a period of time equivalent to plural dots. With the second control system 40' that performs the control in the dot unit, compared with the control performed in the line unit, it is possible to perform control of current consumption at a shorter period.

(Display Device)

In the above explanation, the video signal processing circuit 10 or 10' according to the embodiment of the present disclosure or the modification of the embodiment is provided as an external circuit of the display device 20. However, the display device 20 may be provided as a display panel and the display panel 20 and the video signal processing circuit 10 or 10' may be provided as a display device (the display device according to the present disclosure).

As the display device (panel) 20, besides a widely-known liquid crystal display device (LCD) and a widely-known plasma display device (PDP), an organic electroluminescence (EL) display device including a current-driven electro-optical component, for example, an organic EL component as a light-emitting component of a pixel can be exemplified. The current-driven electro-optical component is alight-emitting component, light emission luminance of which changes according to a current value flowing to a device. As the current-driven electro-optical component, besides the organic EL component, an inorganic EL component, an LED component, a semiconductor laser component, and the like can be exemplified.

<3. Electronic Apparatus>

The display device including the video signal processing circuit according to the embodiment of the present disclosure or the modification of the embodiment explained above (the display device according to the present disclosure) can be applied to display units of electronic apparatuses in various fields that display, as an image or a video, a video signal input thereto or a video signal generated therein. Specifically, the display device according to the present disclosure can be used as display units of, for example, a digital camera, a notebook personal computer, a portable terminal apparatus such as a cellular phone, and a video camera.

As it is evident from the explanation of the embodiment or the modification of the embodiment, with the video signal processing circuit according to the present disclosure, it is possible to control power consumption in the maximum two frames. Therefore, when the display device including the video signal processing circuit according to the present disclosure is used as a display unit of an electronic apparatus in which an upper limit of power consumption in one frame is set, since the power consumption of the display device can be limited to be equal to or smaller than fixed power consumption, it is possible to contribute to a reduction of the power consumption of the electronic apparatus.

A specific example of the electronic apparatus to which the present disclosure is applied is explained below.

Figure 7:
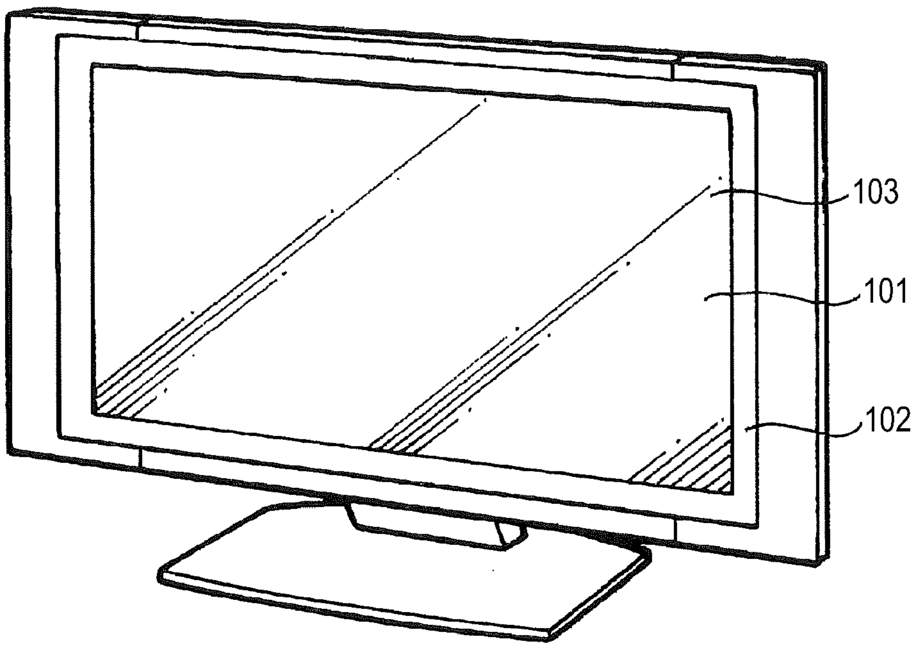
FIG. 7 is a perspective view of the external appearance of a television set to which the present disclosure is applied.

FIG. 7 is a perspective view of the external appearance of a television set to which the present disclosure is applied. The television set according to this application example includes a video display screen unit 101 including a front panel 102 and a filter glass 103. The display device according to the present disclosure is used as the video display screen unit 101.

Figure 8A:
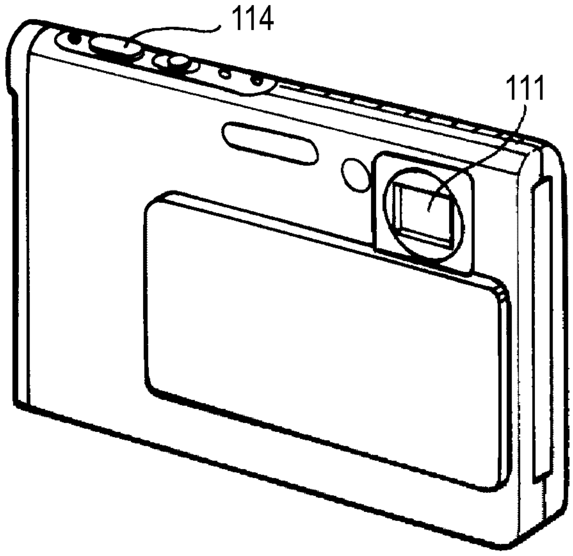
Figure 8B:
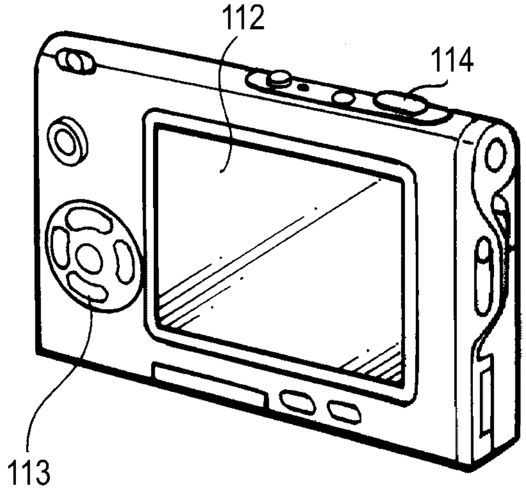

FIGS. 8A and 8B are perspective views of the external view of a digital camera to which the present disclosure is applied. FIG. 8A is a perspective view of the digital camera viewed from the front side and FIG. 8B is a perspective view of the digital camera viewed from the rear side. The digital camera according to this application example includes a light emitting unit 111 for flash, a display unit 112, a menu switch 113, and a shutter button 114. The display device according to the present disclosure is used as the display unit 112.

Figure 9:
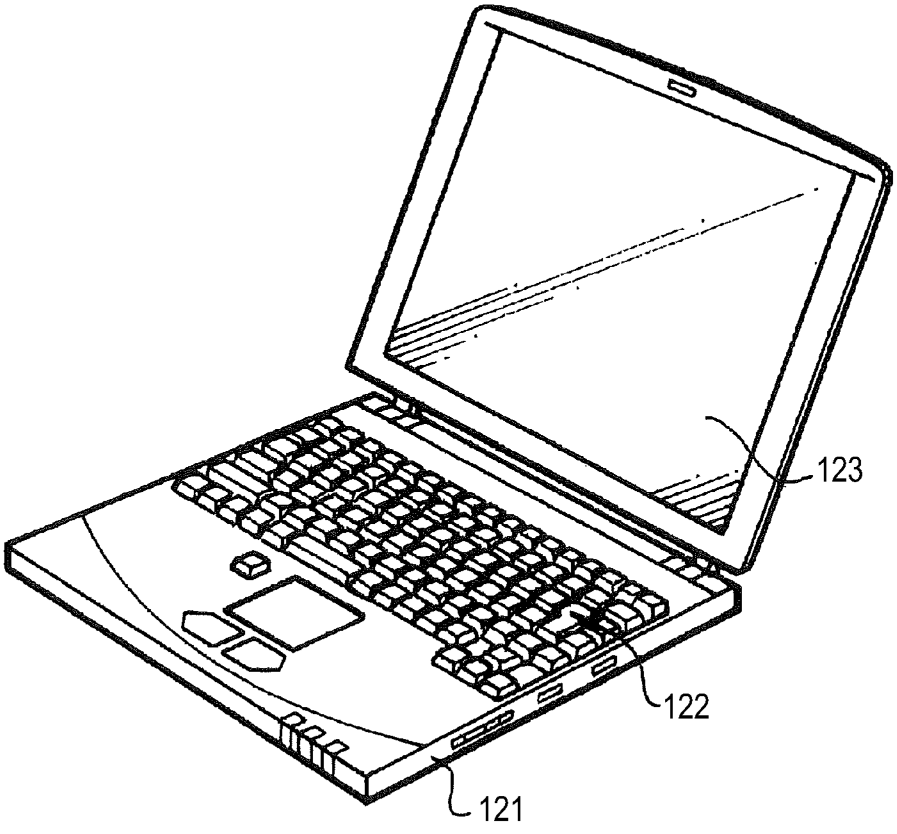
FIG. 9 is a perspective view of the external appearance of a notebook personal computer to which the present disclosure is applied.

FIG. 9 is a perspective view of the external appearance of a notebook personal computer to which the present disclosure is applied. The notebook personal computer according to this application example includes, in a main body 121, a keyboard 122 operated when characters and the like are input and a display unit 123 that displays an image. The display device according to the present disclosure is used as the display unit 123.

Figure 10:
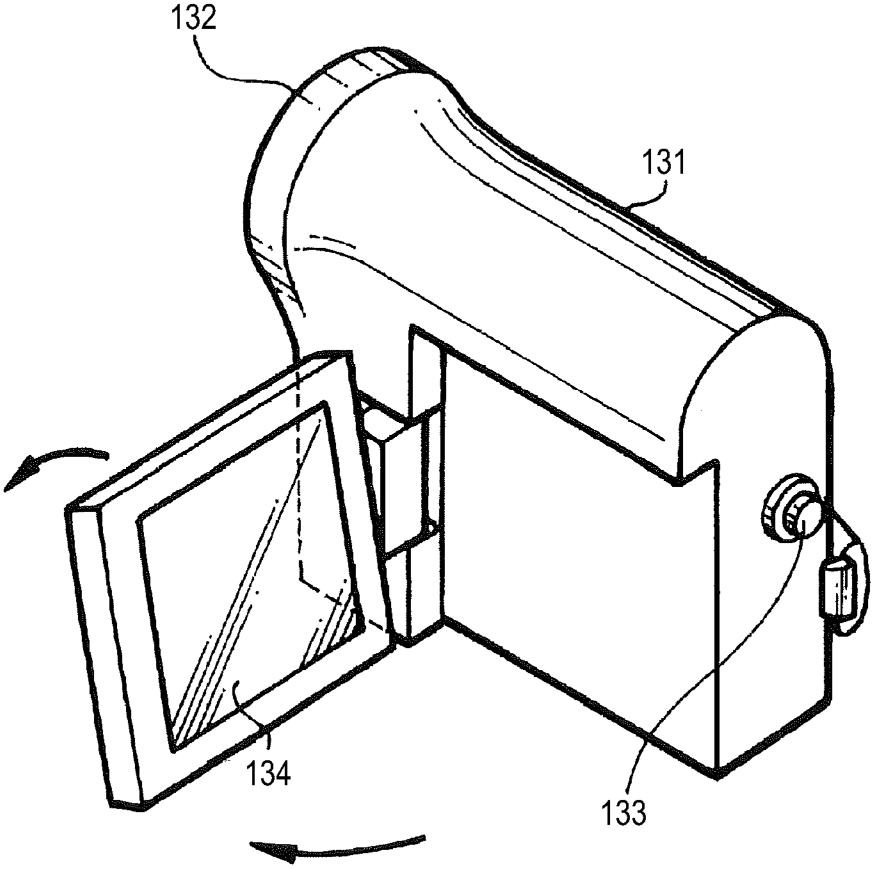
FIG. 10 is a perspective view of the external appearance of a video camera to which the present disclosure is applied.

FIG. 10 is a perspective view of the external appearance of a video camera to which the present disclosure is applied. The video camera according to this application example includes a main body unit 131, a lens 132 for subject photographing on the front side of the main body unit 131, a start/stop switch 133 used in photographing, and a display unit 134. The display device according to the present disclosure is used as the display unit 134.

Figures 11A, 11B, 11C, 11D, 11E, 11F, 11G:
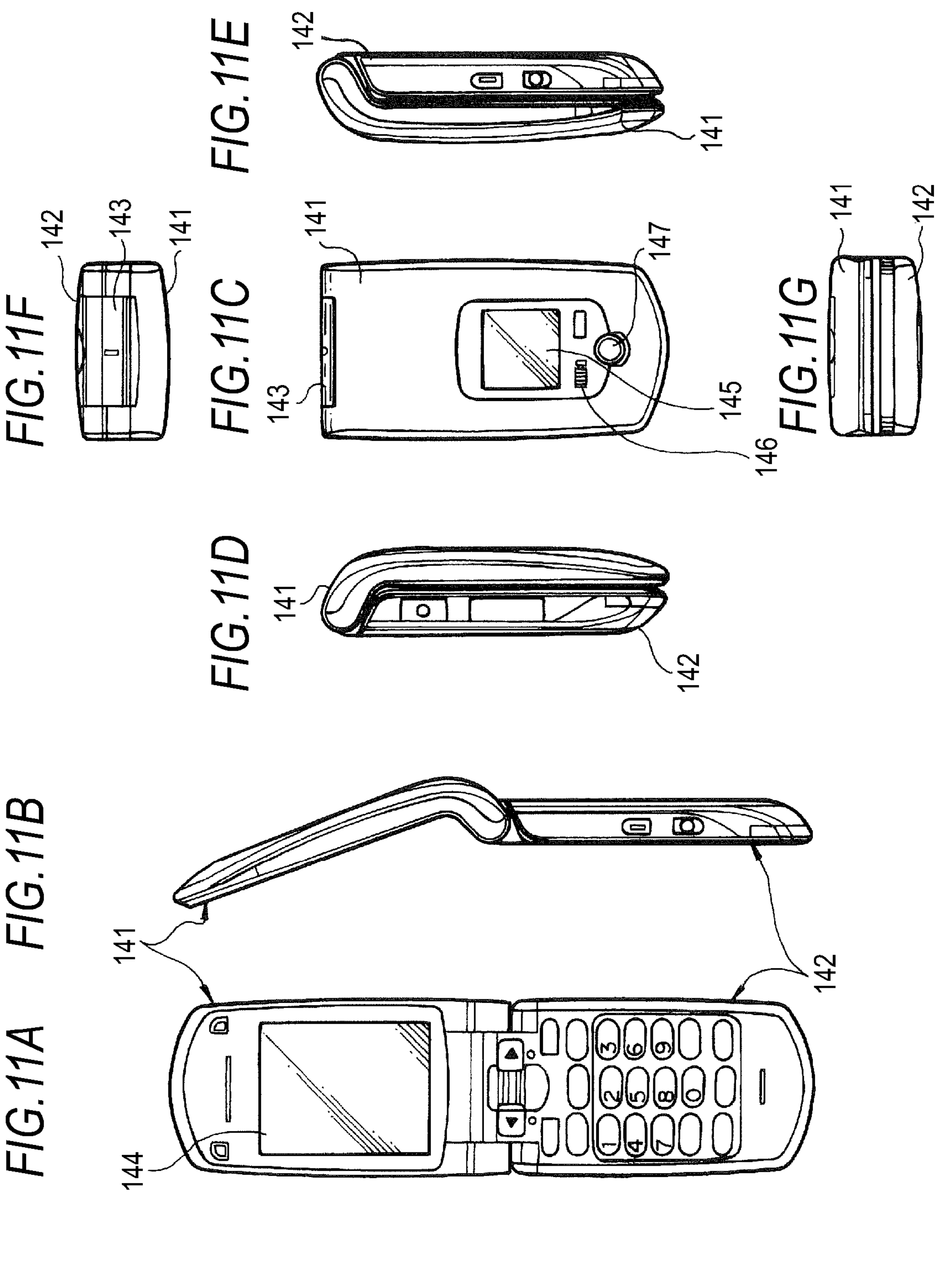

FIGS. 11A to 11G are external views of a portable terminal apparatus, for example, a cellular phone to which the present disclosure is applied. FIG. 11A is a front view of the cellular phone in an open state, FIG. 11B is aside view of the cellular phone in the open state, FIG. 11C is a front view of the cellular phone in a closed state, FIG. 11D is a left side view of the cellular phone, FIG. 11E is a right side view of the cellular phone, FIG. 11F is a top view of the cellular phone, and FIG. 11G is a bottom view of the cellular phone. The cellular phone according to this application example includes an upper housing 141, a lower housing 142, a coupling section (a hinge section) 143, a display 144, a sub-display 145, a picture light 146, and a camera 147. The display device according to the present disclosure is used as the display 144 and the sub-display 145.

<4. Configuration of the Present Disclosure>

(1) A video signal processing circuit including a control unit that calculates a luminance integrated value on the basis of an input video signal and performs luminance control for the video signal on the basis of the calculated luminance integrated value, wherein the control unit calculates the luminance integrated value at a period shorter than time equivalent to one frame.

(2) The video signal processing circuit according to (1), wherein the control unit controls amplitude of the video signal to be small when the luminance integrated value is larger than a control target value.

(3) The video signal processing circuit according to (1) or (2), wherein the period shorter than the time equivalent to one frame is a unit of time equivalent to one line.

(4) The video signal processing circuit according to (3), wherein the period shorter than the time equivalent to one frame is the time equivalent to one line.

(5) The video signal processing circuit according to (3), wherein the period shorter than the time equivalent to one frame is time equivalent to plural lines.

(6) The video signal processing circuit according to (1) or (2), wherein the period shorter than the time equivalent to one frame is a unit of time equivalent to one dot.

(7) A video signal processing circuit including:

a first control system that calculates a luminance integrated value at a period of time equivalent to one frame and controls a video signal on the basis of the calculated luminance integrated value; and a second control system that calculates a luminance integrated value at a period shorter than the time equivalent to one frame and controls the video signal on the basis of the calculated luminance integrated value.

(8) The video signal processing circuit according to (7), wherein the first control system and the second control system control the video signal to be small when the luminance integrated value is larger than a control target value.

(9) The video signal processing circuit according to (7) or (8), wherein the second control system calculates the luminance integrated value in a unit of time equivalent to one line.

(10) The video signal processing circuit according to (9), wherein the second control system calculates the luminance integrated value at a period of time equivalent to one line.

(11) The video signal processing circuit according to (9), wherein the second control system calculates the luminance integrated value at a period of time equivalent to plural lines.

(12) The video signal processing circuit according to (7), wherein the second control system calculates the luminance integrated value in a unit of time equivalent to one dot.

(13) The video signal processing circuit according to any one of (7) to (12), wherein the second control system is provided at a post-stage of the first control system.

(14) The video signal processing circuit according to (13), wherein a control target value of the second control system is set to a value higher than a control target value of the first control system.

(15) A video signal processing method including, in calculating a luminance integrated value on the basis of an input video signal and performing luminance control for the video signal on the basis of the calculated luminance integrated value, calculating the luminance integrated value at a period shorter than time equivalent to one frame.

(16) A display device including a control unit that calculates, on the basis of an input video signal, a luminance integrated value at a period shorter than time equivalent to one frame and performs luminance control for the video signal on the basis of the calculated luminance integrated value.

(17) An electronic apparatus including a display device including a control unit that calculates, on the basis of an input video signal, a luminance integrated value at a period shorter than time equivalent to one frame and performs luminance control for the video signal on the basis of the calculated luminance integrated value.

The present disclosure contains subject matter related to that disclosed in Japanese Priority Patent Application JP 2011-132006 filed in the Japan Patent Office on Jun. 14, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing circuit comprising:

a first control system that is configured to calculate a first luminance integrated value periodically at a period equal to a first unit of time equivalent to one frame and controls a video signal on the basis of the calculated first luminance integrated value; and a second control system that is provided at a post-stage of the first control system and that is configured to calculate a second luminance integrated value periodically at a period equal to a second unit of time that is shorter than the first unit of time and controls the video signal on the basis of the calculated second luminance integrated value, wherein the first luminance integrated value is calculated for each frame and the video signal for a current frame is controlled on the basis of the calculated first luminance integrated value of a preceding frame, the second control system is configured to calculate an average luminance value on the basis of the controlled video signal output from the first control system for each time period equivalent to the second unit of time, and the second control system is configured to calculate the second luminance integrated value by integrating each respective average luminance value that has been calculated from a timing corresponding to a beginning of the current frame to a most recent timing and controls the video signal on the basis of a most recent second luminance integrated value.

2. The video signal processing circuit according to claim 1, wherein:

the first control system is configured to control the video signal by multiplying the video signal by a first value, the first value being updated each frame based on the most recently calculated first luminance integrated value, and the second control system is configured to control the video signal by multiplying an output signal of the first control system by a second value, the second value being updated each second unit of time based on the most recently calculated second luminance integrated value.

3. The video signal processing circuit according to claim 1, wherein the first control system reduces the amplitude of the video signal when the first luminance integrated value is larger than a control target value, and the second control system reduces the amplitude of the video signal when the second luminance integrated value is larger than the control target value.

4. The video signal processing circuit according to claim 1, wherein the second unit of time is equivalent to an integer number of lines.

5. The video signal processing circuit according to claim 4, wherein the second unit of time is equivalent to one line.

6. The video signal processing circuit according to claim 4, wherein the second unit of time is equivalent to plural lines.

7. The video signal processing circuit according to claim 1, wherein the second unit of time is equivalent to one dot.

8. A display device comprising the video signal processing circuit of claim 1.

9. The display device according to claim 8, wherein:

the first control system is configured to control the video signal by multiplying the video signal by a first value, the first value being updated each frame based on the most recently calculated first luminance integrated value, and the second control system is configured to control the video signal by multiplying an output signal of the first control system by a second value, the second value being updated each second unit of time based on the most recently calculated second luminance integrated value.

10. The display device according to claim 8, wherein the first control system reduces the amplitude of the video signal when the first luminance integrated value is larger than a control target value, and the second control system reduces the amplitude of the video signal when the second luminance integrated value is larger than the control target value.

11. The display device according to claim 8, wherein the second unit of time is equivalent to an integer number of lines.

12. The display device according to claim 11, wherein the second unit of time is equivalent to one line.

13. The display device according to claim 11, wherein the second unit of time is equivalent to plural lines.

14. The display device according to claim 8, wherein the second unit of time is equivalent to one dot.

15. An electronic apparatus comprising the display device of claim 8.

16. The electronic apparatus according to claim 15, wherein:

the first control system is configured to control the video signal by multiplying the video signal by a first value, the first value being updated each frame based on the most recently calculated first luminance integrated value, and the second control system is configured to control the video signal by multiplying an output signal of the first control system by a second value, the second value being updated each second unit of time based on the most recently calculated second luminance integrated value.

17. The electronic apparatus according to claim 15, wherein the first control system reduces the amplitude of the video signal when the first luminance integrated value is larger than a control target value, and the second control system reduces the amplitude of the video signal when the second luminance integrated value is larger than the control target value.

18. The electronic apparatus according to claim 15, wherein the second unit of time is equivalent to an integer number of lines.

19. The electronic apparatus according to claim 18, wherein the second unit of time is equivalent to one line.

20. The electronic apparatus according to claim 18, wherein the second unit of time is equivalent to plural lines.

21. The electronic apparatus according to claim 15 wherein the second unit of time is equivalent to one dot.

* * * * *